US012174587B2

(12) United States Patent
Stranczl

(10) Patent No.: US 12,174,587 B2
(45) Date of Patent: Dec. 24, 2024

(54) TIMEPIECE COMPRISING A ROTATING BEZEL

(71) Applicant: Montres Breguet S.A., L'Abbaye (CH)

(72) Inventor: Marc Stranczl, Nyon (CH)

(73) Assignee: Montres Breguet S.A., L'Abbaye (CH)

( * ) Notice: Subject to any disclaimer, the term of this patent is extended or adjusted under 35 U.S.C. 154(b) by 484 days.

(21) Appl. No.: 17/519,108

(22) Filed: Nov. 4, 2021

(65) Prior Publication Data

US 2022/0206438 A1 Jun. 30, 2022

(30) Foreign Application Priority Data

Dec. 24, 2020 (EP) .................................... 20217190

(51) Int. Cl.
*G04B 19/28* (2006.01)

(52) U.S. Cl.
CPC .................................. *G04B 19/283* (2013.01)

(58) Field of Classification Search
CPC .................................................... G04B 19/283
See application file for complete search history.

(56) References Cited

U.S. PATENT DOCUMENTS

2016/0252888 A1 9/2016 Kim et al.

FOREIGN PATENT DOCUMENTS

EP 2 998 799 A1 3/2016
KR 10-2016-0105016 A 9/2016

OTHER PUBLICATIONS

Wikipedia article "Ferromagnetism", captured by the Internet Archive Aug. 6, 2019 (Year: 2019).*
European Search Report for EP 20 21 7190 dated Jun. 2, 2021.

* cited by examiner

*Primary Examiner* — Edwin A. Leon
*Assistant Examiner* — Sean R Brannon
(74) *Attorney, Agent, or Firm* — Sughrue Mion, PLLC

(57) ABSTRACT

A timepiece including a rotating bezel, mounted on a middle with N stable angular positions, and a magnetic device (20) composed of a first set of Z1 magnets (22) carried by the rotating bezel and of a second set of Z2 magnets (24) carried by the middle. The first and second sets of magnets are each arranged circularly in such a way as to have between them a magnetic interaction engendering on the rotating bezel a resisting magnetic torque, over at least a part of an angular pitch, when this rotating bezel is driven in rotation from any one of the N stable angular positions. The numbers Z1 and Z2 are greater than one and less than N. The Z1 and Z2 magnets are distributed angularly so the resisting magnetic torque has a variation according to the stable angular position of the rotating bezel.

15 Claims, 5 Drawing Sheets

TIMEPIECE COMPRISING A ROTATING BEZEL

CROSS REFERENCE TO RELATED APPLICATIONS

This application is a Non-Provisional application, claiming priority based on European Patent Application No. 20217190.6 filed Dec. 24, 2020.

TECHNICAL FIELD OF THE INVENTION

The present invention relates to the horological field, in particular of the timepieces provided with a rotating bezel.

TECHNOLOGICAL BACKGROUND

From the patent application EP 2 998 799, a timepiece is known provided with a rotating bezel, the stable angular positions of which are defined by two rows of magnets arranged circularly facing one another, these two rows of magnets being fastened respectively to the rotating bezel and to a middle supporting the rotating bezel. To obtain 60 stable angular positions allowing to position the rotating bezel in 60 different positions corresponding to 60 minutes, in one alternative two rows of 60 magnets, or 120 magnets, and in another alternative a first row of 60 magnets and a second row with a lesser number of magnets, so as to reduce a resisting stress to go from one stable angular position to a following one, are provided. This embodiment requires, in particular in the first alternative, many magnets. Then, all the stable angular positions are similar, that is to say that the resistive stress for going from one stable angular position to a following one is identical for all the stable angular positions. No differentiation is provided, in particular to mark the positions corresponding to a multiple of five minutes, in the force torque that a user that actuates the rotating bezel must apply.

SUMMARY OF THE INVENTION

The goal of the present invention is to overcome the disadvantages mentioned in the technological background, and in particular to propose a timepiece provided with a rotating bezel with a magnetic device between the bezel and the part of the external parts supporting this rotating bezel that is arranged in such a way that the resisting magnetic torque has a variation according to the stable angular position, that is to say at least two levels/two different values for the plurality of stable angular positions provided. Moreover, the present invention proposes achieving the aforementioned goal via a magnetic device that is not very complex, relatively not costly and not bulky, and which can be easily carried out in a case with the conventional dimensions for a watch with a rotating bezel.

For this purpose, the present invention relates to a timepiece comprising a rotating bezel mounted on a part of external parts of this timepiece and which can be actuated in rotation by a user, this rotating bezel having N stable angular positions, N being an integer greater than two, which have between them an angular pitch $\alpha$ equal to 360° divided by N ($\alpha$=360°/N). Then, the timepiece comprises a magnetic device composed of a first set of first polar parts carried in a fixed manner by the rotating bezel and of a second set of second polar parts carried in a fixed manner by the part of the external parts. The first set of first polar parts and the second set of second polar parts are each arranged circularly in such a way that the first polar parts have a magnetic interaction with the second polar parts that engenders on the rotating bezel a resisting magnetic torque when this rotating bezel is driven in rotation, at least in one given direction, from any one of the N stable angular positions to a following, that is to say adjacent, stable angular position, this resisting magnetic torque being exerted over at least a part of the angular travel, equal to an angular pitch, that separates these two stable angular positions.

The timepiece according to the invention is characterised in that the number Z1 of first polar parts is greater than one and less than N ($1<Z1<N$) and the number Z2 of second polar parts is also greater than one and less than N ($1<Z2<N$), and in that the first set of the Z1 first polar parts is distributed among N first angular positions, linked to the rotating bezel and having between them said angular pitch, with at most one first polar part per first angular position, and the second set of the Z2 second polar parts is distributed among N second angular positions, linked to said part of the external parts and having between them said angular pitch, with at most one second polar part per second angular position, in such a way that said resisting magnetic torque has a variation according to the stable angular position of the rotating bezel, among the N stable angular positions, at least according to said given direction for the rotation of this rotating bezel.

The expression "resisting magnetic torque" is understood as being a resisting torque exerted on the rotating bezel that results from the magnetic forces between the two sets of polar parts. Thus, this resisting magnetic torque can be formed at least in part by a resisting torque coming from a force of friction between the rotating bezel and a part of the external parts that results from said magnetic forces.

According to a general embodiment of the invention, the first polar parts are magnetically similar and the second polar parts are magnetically similar. Then, the numbers Z1 and Z2 are selected and the distribution of the first set of Z1 first polar parts, among the N first angular positions, as well as the distribution of the second set of Z2 second polar parts, among the N second angular positions, are carried out so that said variation in the resisting magnetic torque is periodic.

According to a preferred embodiment of the invention, the magnetic device is arranged in such a way that the periodic variation in the resisting magnetic torque has an angular period equal to an integer K of angular pitches, this integer K being greater than one and selected so that the division of the integer N by the number K is equal to a positive integer M. Then, the numbers Z1 and Z2 are selected and said distribution of the first set of Z1 first polar parts as well as the distribution of the second set of Z2 second polar parts are carried out so that said variation in the resisting magnetic torque has, for said given direction of rotation of the rotating bezel, substantially two non-zero distinct values.

Various embodiments and various advantageous alternatives will be presented in the detailed description of the invention that follows.

BRIEF DESCRIPTION OF THE DRAWINGS

The invention will be described below in a more detailed manner via the appended drawings, given as examples that are in no way limiting, in which.

DETAILED DESCRIPTION OF THE INVENTION

In reference to FIGS. 1 to 5, a first embodiment of a timepiece according to the invention will be described. The watch 2 comprises a case 4 provided with a rotating bezel 6, actuatable in rotation by a user, and a magnetic device 20 associated with this rotating bezel. The rotating bezel and the magnetic device are arranged so that the rotating bezel can be positioned in sixty stable angular positions that have between them an angular pitch α equal to 6° (equal to 360°/60). Thus, a point of reference of the rotating bezel can be positioned at any minute of a graduation of the minutes centred on the axis of rotation of the rotating bezel, as is usual for a mechanical or electromechanical watch that is equipped with a rotating bezel. It is noted that, in general, the invention applies to N stable angular positions, N being an integer greater than two, which have between them an angular pitch α equal to 360° divided by N (α=360°/N).

Figure 1:
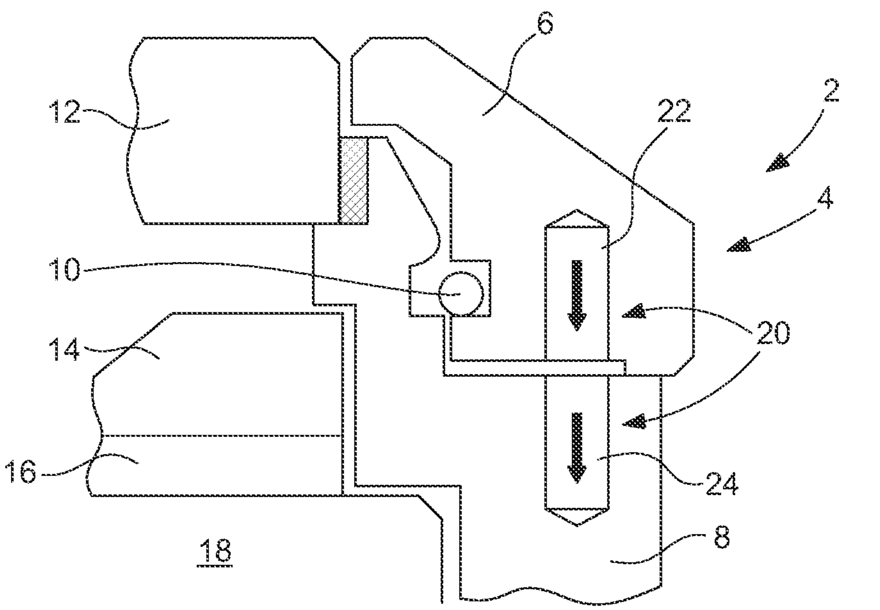
FIG. 1 is a partial transverse cross-section of a watch according to a first embodiment of the invention.

The rotating bezel 6 is mounted on a middle 8, forming a part of the external parts of the watch, and maintained in place via a spring 10 inserted partly into an internal lateral groove of the middle and partly into an internal lateral groove of the rotating bezel. FIG. 1 also partly shows a glass 12, carried by a fixed internal bezel formed by an upper part of the middle 8, as well as a tapered flange 14 and a dial 16 arranged on a movement 18. The magnetic device 20 is arranged inside the case 4 of the watch and is composed of a first set of first polar parts 22, which are arranged in a fixed manner in the rotating bezel 6, and of a second set of second polar parts 24 which are arranged in a fixed manner in the middle 8. More precisely, the first set of first polar parts 22 and the second set of second polar parts 24 are each arranged circularly and globally facing one another so that the first polar parts have a magnetic interaction with the second polar parts, this magnetic interaction engendering on the rotating bezel a non-zero resisting magnetic torque when this rotating bezel is subjected to a torque for driving in rotation, in one direction or the other, from any one of the sixty stable angular positions. It is noted that the bezel is bidirectional here, that is to say rotating in both directions. In one alternative, the bezel can be unidirectional, so that it thus rotates only in one given direction.

According to a general alternative of the invention, the first polar parts are magnetically similar and the second polar parts are also magnetically similar. The first embodiment is characterised by the fact that the first set of first polar parts and the second set of second polar parts are formed from materials engendering a magnetic attraction between this first set and this second set. Then, the N stable angular positions each correspond by a positioning of first polar parts respectively facing second polar parts. In the absence of a mechanical device associated with the magnetic device, the angular positioning of the rotating bezel is obtained via the magnetic device which engenders a return torque on the rotating bezel around each of its stable angular positions. It is noted that, in embodiments not described in detail here, it is possible to associate a mechanical device with the magnetic device to precisely obtain the stable angular positions of the rotating bezel, such a mechanical device being able to participate in a force for return towards each stable angular position.

In a first main alternative shown in the drawings, the first set of first polar parts 22 and the second set of second polar parts 24 are both formed by permanent magnets, the second set of magnets 24 being arranged in magnetic attraction with the first set of magnets 22. In a second main alternative, not shown, one set out of the first set of first polar parts and the second set of second polar parts is formed by permanent magnets, while the other set is formed by parts made of ferromagnetic material. The first main alternative is advantageous by the fact that the force of magnetic attraction can be greater than in the second main alternative for identical permanent magnets. The second main alternative can be of interest since it allows to reduce the cost and the bulk of the magnetic device according to the axial direction, since the ferromagnetic parts can have a relatively small height. In the alternative shown in FIG. 1, the arrangement of the magnets 22 and of the magnets 24 is axial, that is to say that they are aligned according to the direction of the axis of rotation of the rotating bezel and that the orientation of the magnetic axes of these magnets is substantially parallel to this axis of rotation.

An axial arrangement of the two sets of polar parts, globally engendering a force of attraction between the rotating bezel 4 and the middle 8, has the advantage of pressing the rotating bezel against the middle and thus participating in maintaining in place the rotating bezel. The spring 10 that maintains the bezel assembled to the middle could thus theoretically be eliminated. In practice, it is preferable to preserve the spring for safety reasons. However, the axial force of this spring on the bezel can be provided to be relatively weak, or even zero, so that the force of static friction, then the force of dynamic friction, to be overcome during an actuation of the rotating bezel is not very high. If the force of friction between the rotating bezel and the middle is too high, this force of friction can thus lead, when a torque for return towards each stable angular position is insufficient to overcome the resisting torque engendered by this force of friction, to an imprecise angular positioning of the rotating bezel in the stable angular positions provided. To avoid the axial magnetic force disturbing, via the force of friction that it engenders, a precise angular positioning of the rotating bezel, it is possible for the spring

10 to be arranged in such a way as to exert on the rotating bezel an axial force having a direction opposite to the axial magnetic force. As already indicated, it is possible to associate with the magnetic device a complementary mechanical device to obtain a precise positioning of the rotating bezel in the stable angular positions provided. To overcome the problem indicated here, in another alternative of the first embodiment, the two sets of magnets are arranged in the same general plane with a radial orientation of their respective magnetic axes (in a manner similar to the alternative of the second embodiment shown in FIG. 6). It should be noted that in a specific embodiment, the two sets of polar parts are arranged obliquely in such a way as to be able to thus adjust the value of an axial magnetic force applied to the rotating bezel.

It is thus observed that in alternatives with an axial or oblique arrangement of the two sets of polar parts having between them a magnetic attraction, two components of the magnetic forces being exerted on the polar parts of the first set associated with the rotating bezel are to be considered in the arrangement of the rotating bezel and of the magnetic device, namely the axial component and the tangential component. The axial component, if it is not compensated for, engenders a force of friction between the rotating bezel and the middle that always opposes the movement of rotation of this bezel and thus engenders a part of a first resisting magnetic torque that is exerted over the entire angular travel, or over an angular pitch, of the rotating bezel between any two adjacent stable angular positions (that is to say between any stable angular position and a following stable angular position in the direction of rotation of the rotating bezel). The tangential component defines a magnetic return torque that tends to position the rotating bezel in one or the other of the stable angular positions provided and which forms a second resisting magnetic torque over only a first part of the aforementioned angular travel. Indeed, over a second part of the angular travel, the tangential component of the magnetic forces being exerted respectively on the polar parts of the first set of polar parts changes direction and thus engenders a torque for driving towards the following angular position. Thus, over the first part of said angular travel, a resisting magnetic torque is always applied globally onto the rotating bezel, whereas over the second part of this angular travel the global magnetic torque (that is to say resulting from the magnetic forces between the two sets of polar parts) can be resisting over a first angular zone and become driving over a second angular zone if the magnetic return torque becomes greater than the friction torque of magnetic origin.

In general, the magnetic device according to the invention is characterised in that the number Z1 of first polar parts in the first set is greater than one and less than N (or $1<Z1<N$) and the number Z2 of second polar parts in the second set is also greater than one and less than N (or $1<Z2<N$). Then, the first set of the Z1 first polar parts is distributed among N first angular positions, linked to the rotating bezel and having between them said angular pitch, with at most one first polar part per first angular position, and the second set of the Z2 second polar parts is distributed among N second angular positions, linked to the middle and having between them said angular pitch, with at most one second polar part per second angular position, in such a way that the resisting magnetic torque engendered by the magnetic device has a variation according to the stable angular position of the rotating bezel, among the N stable angular positions, at least according to a given direction for the rotation of this rotating bezel.

The variation in the resisting magnetic torque according to the invention is not related to the angular distance of the rotating bezel, inside an angular pitch, from any stable angular position, but this variation is related to the stable angular position itself, that is to say that the resisting magnetic torque during an actuation in rotation of the rotating bezel from a stable angular position to a following stable angular position, for a distance of zero and/or at least a certain given distance inside the angular pitch separating these two stable angular positions, varies according to the stable angular position from which the actuation in rotation is carried out, at least for one given direction of rotation. Indeed, the resisting magnetic torque engendered by the magnetic device 20 varies, from any stable angular position, according to the distance of the bezel relative to this stable angular position in the patent application EP 2 998 799. But this is not the variation forming the object of the main feature of the present invention, since this variation in the resisting magnetic torque is a variation felt by the user during the passage between a first stable angular position and a following stable angular position relative to the passage between a second stable angular position and a following stable angular position. The alternatives described below will allow to understand well the variation in the resisting magnetic torque that relates to the present invention.

In the alternatives of the magnetic device according to the invention that will be described below, the number Z1 of first polar parts and the number Z2 of second polar parts are selected and the distribution of these Z1 first polar parts, among the N first angular position linked to the bezel, as well as the distribution of these Z2 second polar parts, among the N second angular positions linked to the middle, are carried out so that the variation in the resisting magnetic torque is periodic, that is to say that it repeats after a certain number of angular pitches.

The periodic variation in the resisting magnetic torque has an angular period β equal to an integer K of angular pitches, or $\beta=K\cdot\alpha$, this integer K being greater than one ($K>1$) and selected so that the division of the integer N by the number K is equal to a positive integer M (or $M=N/K$). Preferably, the numbers Z1 and Z2 are selected and said distribution of the first set of the Z1 first polar parts as well as said distribution of the second set of the Z2 second polar parts are carried out so that the variation in the resisting magnetic torque has, for at least one given direction of rotation of the rotating bezel, only two non-zero distinct values. The angular period β of the variation in the resisting magnetic torque is advantageously provided as equal to five times the angular pitch α, or $\beta=5\cdot\alpha$. Preferably, the magnetic device is arranged so that the resisting magnetic torque is once again greater after a rotation equal to the angular period (or every five minutes), that is to say every 30° during a rotation of the rotating bezel.

In reference to FIGS. 2 and 3, the magnetic device 20 incorporated into a first alternative of the first embodiment according to the invention will be described more particularly. In this first alternative, like in the other alternatives that will be described below, the number N of stable angular positions $P_v$, where v=1 to N, of the rotating bezel is equal to sixty (N=60) and the number K is equal to five (K=5). Thus the number M is an even number, equal to twelve (M=12). It should be noted that the number N of stable angular positions $P_v$ corresponds to the number N of angular positions that is provided for the placement of the polar parts of the bezel and also for the placement of the polar parts of the middle.

Figure 6:
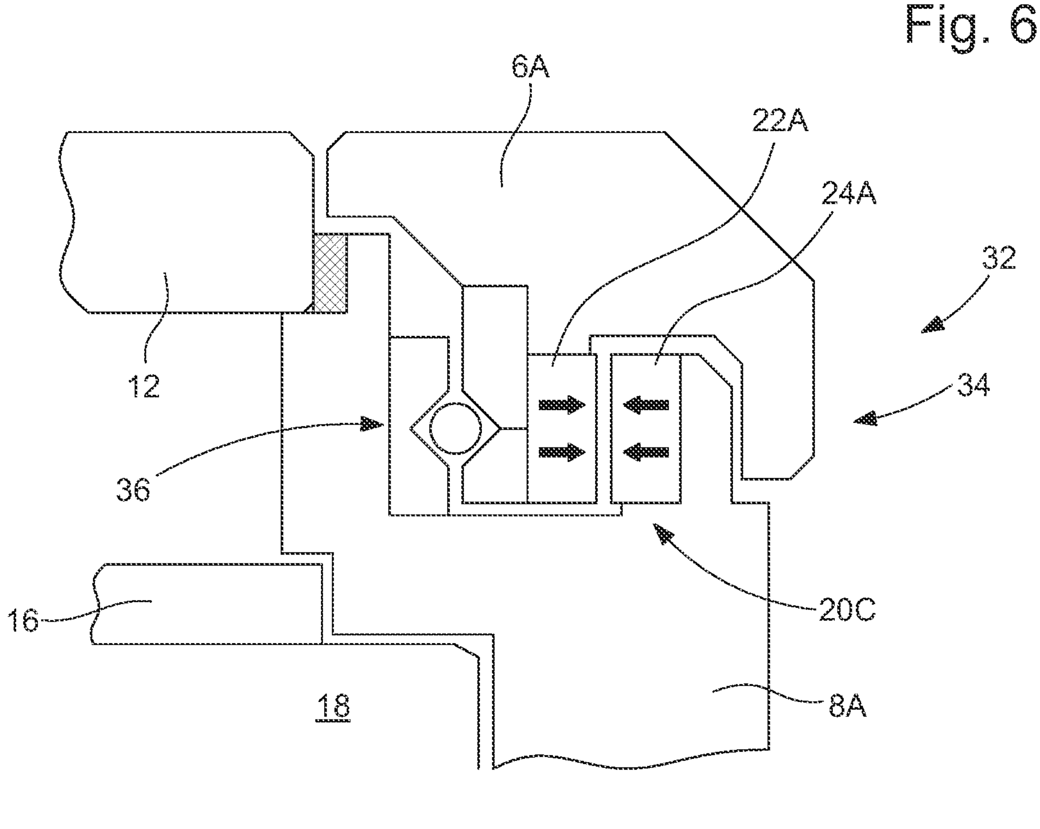
FIG. 6 is a partial transverse cross-section of a watch according to a second embodiment of the invention.
Figure 2:
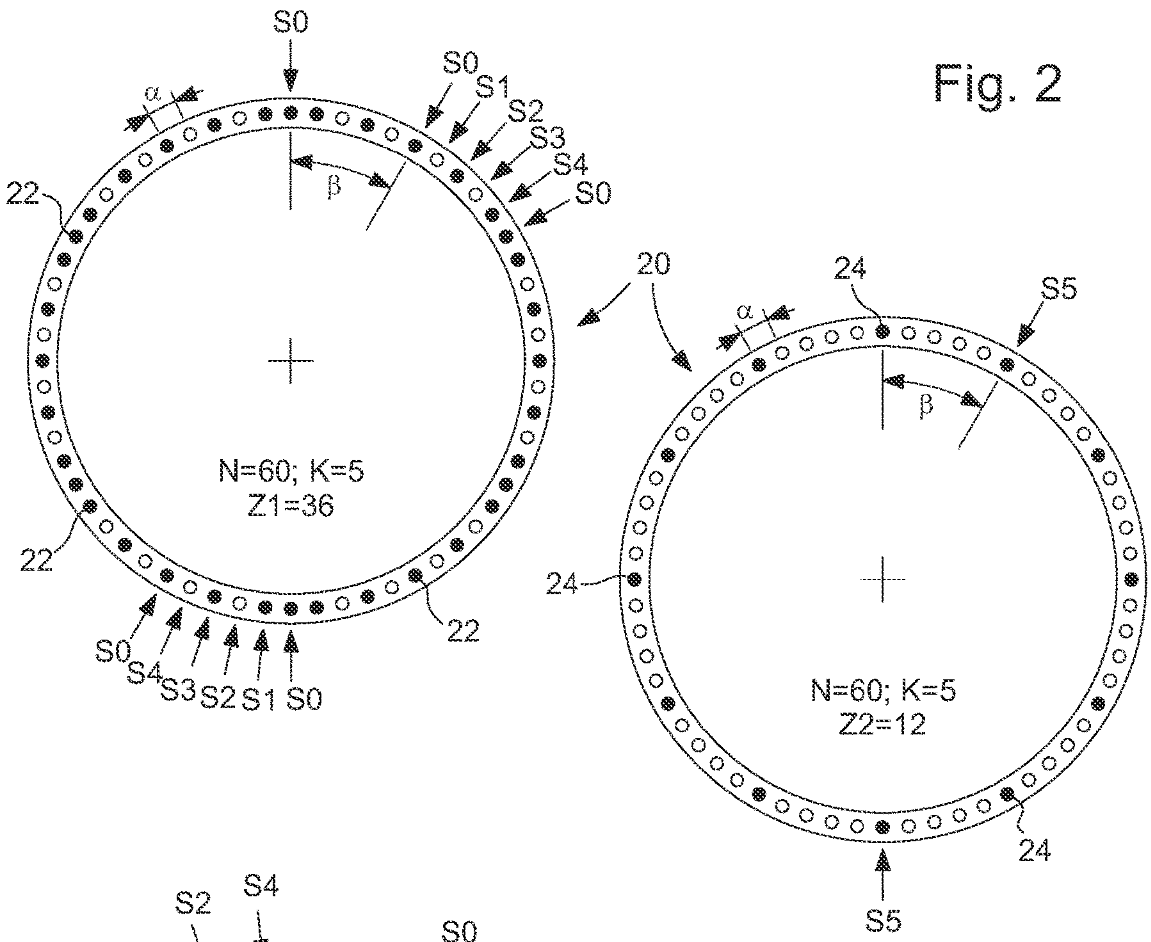
FIG. 2 shows, in a simplified manner, a first alternative of a magnetic device associated with the rotating bezel of the watch of FIG. 1 with, on the one hand, a first set of first polar parts that are rigidly connected to the rotating bezel or to a middle that supports it and, on the other hand, a second set of second polar parts that are rigidly connected to the other of these two parts of the external parts of the watch.
Figure 3:
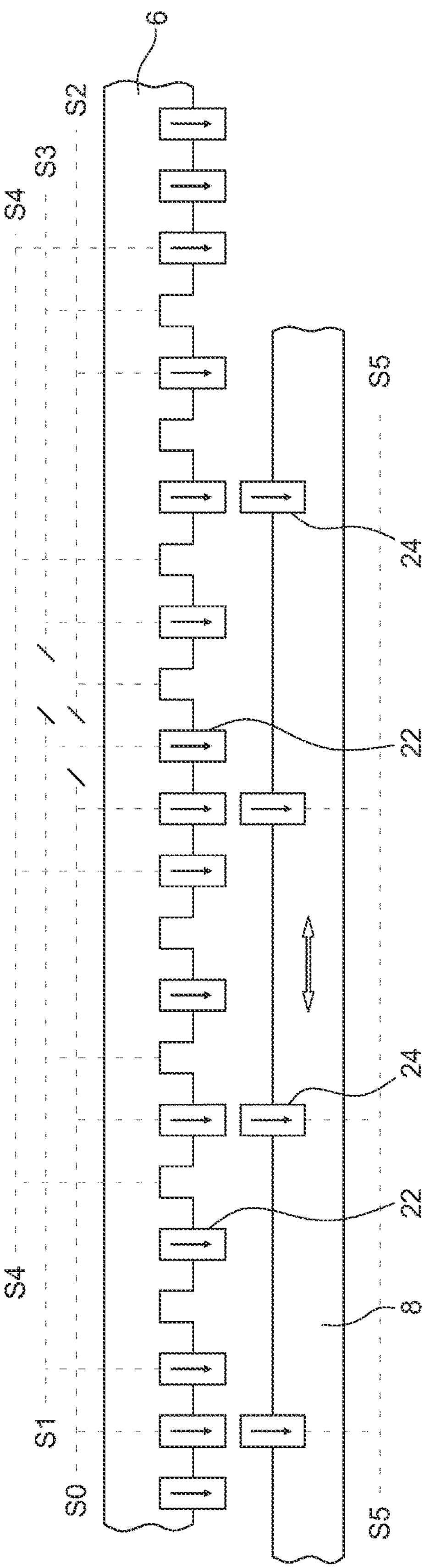
FIG. 3 is a linear diagram of the first alternative of the magnetic device of FIG. 2.

It is noted that FIG. 2 (like the similar Figures that will be described below) is a simplified representation, in a separated manner, of the rotating bezel 6 and of the middle 8, to be able to clearly show the circular arrangement of the polar parts 22 in the bezel and of the polar parts 24 in the middle. In the alternative shown in FIGS. 2 and 3, all the polar parts 22 and 24 are formed by substantially identical magnets, each magnet 22 being arranged in magnetic attraction relative to the magnets 24 when this magnet 22 is placed facing any magnet 24. It is also noted that FIG. 3 (like FIG. 8, which is similar) is a partial linear representation of the magnetic device 20 of FIG. 1. FIG. 3 corresponds to the arrangement of the magnets 22 and 24 in a cylindrical surface with an axial orientation of these magnets (FIG. 8 corresponds to the arrangement of the magnets in a general plane perpendicular to the axis of rotation of the rotating bezel, with a radial orientation of these magnets as shown in FIG. 6).

In the first alternative of the first embodiment, the number Z2 of magnets 24 is equal to M, which is equal to twelve, or Z2=M=N/K=12, and these twelve magnets are distributed regularly with an angular period $\beta=K\cdot\alpha=30°$. In other words, the twelve magnets 24 are placed into a series S5 of twelve angular positions related to the middle (that is to say in a reference frame of polar coordinates linked to the middle) and having between them the angular period $\beta=30°$. The number Z1 of magnets 22 is equal to M+[K−1]·M/2, or Z1=12+4·6=36. A subset of twelve magnets 22 is placed into a first series S0 of twelve angular positions linked to the bezel (that is to say in a reference frame of polar coordinates linked to the bezel) and having between them the angular period $\beta=30°$. The twenty-four remaining magnets 22 are distributed in such a way that four subsets of six magnets are respectively placed into the four other series S1, S2, S3, S4 of twelve angular positions that are also linked to the bezel (that is to say in the reference frame of polar coordinates related to the bezel) and that also have between them the angular period $\beta=30°$. These four other series and the first series are offset angularly between them by the angular pitch $\alpha=360°/N=6°$. These twenty-four remaining magnets 22 are advantageously distributed into the four series S1 to S4 in a regular manner, by having between them an angular distance or an interval equal to double the angular period ($2\cdot\beta$).

It is noted that, given that the Z1 magnets of the first set are placed among N angular positions having between them the angular pitch $\alpha=360°/N$, only K distinct series of M angular positions having between them the angular period $\beta=K\cdot\alpha$, with M=N/K, exist. These K distinct series are angularly offset between them by the angular pitch $\alpha$. The arrangement of the magnetic device according to the first alternative allows to obtain only two non-zero distinct values for the resisting magnetic torque (namely two maximum values of the resisting magnetic torque over an angular travel of one angular pitch between two adjacent stable angular positions) when a drive torque is applied to the rotating bezel from one or the other of its stable angular positions, namely a first value when the series S5 of magnets 24 of the rotating bezel is located initially facing the series S0 of magnets 22 of the middle (as shown in FIG. 3), which corresponds to an initial positioning of the rotating bezel in any one of the stable angular positions $P_{0+nK}$ with n=0 to 11, and a second value, lower than the first value, when the series S5 of magnets 24 is located initially facing one or the other of the series S1 to S4, which corresponds to an initial positioning of the rotating bezel in any one of the stable angular positions $P_{q+nK}$ with q=1 to 4 and n=0 to 11. There is therefore a variation in the resisting magnetic torque, that is to say in its intensity, according to the stable angular position in which the rotating bezel is initially located. In the example given, since the series S1 to S4 comprise two times less magnets 22 than the series S0, the resisting magnetic torque varies substantially by a factor of two, the second aforementioned value being substantially equal to half of the first aforementioned value.

It is noted first of all that either the series S5 of magnets, or the five series S0 to S4 of magnets can, in another alternative, be replaced by parts made of ferromagnetic material. Thus, in a specific alternative, the first set of polar parts associated with the rotating bezel is formed by the toothing of a crown made of ferromagnetic material from which several teeth have been removed to obtain a profile similar to that of the upper part shown in FIG. 3. It is noted that the empty holes can be eliminated in an alternative of FIG. 3. It is then noted that it is possible to invert the arrangement of the polar parts, that is to say that the first set of polar parts can be linked to the middle while the second set of polar parts can be linked to the rotating bezel without this changing the operation of the magnetic device. Thus, in one alternative, the series S5 can be composed of magnets 22 arranged in the rotating bezel, the series S0 to S4 thus being composed of magnets 24 arranged in the middle. It is further noted that, in several alternatives to the first alternative described above, the batch of six magnets 22 placed into each of the four series S1 to S4 can be placed according to all the possibilities of placing six identical magnets among the twelve angular positions of the series considered. It should further be noted that the four subsets of magnets placed respectively into the four series S1 to S4 can each have the same number of magnets different that M/2=6 as long as this number is less than the number M, and thus always satisfy the condition linked to the variation in the resisting magnetic torque according to the invention. Finally, it is noted that, in another less advantageous alternative, it is possible to place less than M magnets into the series S0, as long as the number of magnets in the other series S1 to S4 remains less than that of the series S0.

The various preceding remarks bring us to formulate a general alternative covering the first alternative described above. In this general alternative, one of the two numbers Z1 and Z2 is equal to M (M=N/K) and the corresponding M polar parts, forming the set in question of polar parts, are distributed regularly while having between them the angular period $\beta$, while the other of the two numbers Z1 and Z2 is equal to M+[K−1]·Y, where Y is a positive integer smaller than M and K is the number of angular pitches in the angular period. Then, a subset of M polar parts, which correspond to said other of the two numbers Z1 and Z2 and are polar parts of the set relating thereto, are placed into a first series of M respective angular positions having between them the angular period. Finally, the [K−1]·Y remaining polar parts are distributed in such a way that Y polar parts are placed into each of K−1 other series of M angular positions having between them the angular period $\beta$, the first series and the K−1 other series being angularly offset between them by said angular pitch.

In a specific alternative of the general alternative described above, the number M is an even number and the number Y is equal to M/2. Moreover, the Y polar parts placed into each of said K−1 other series are preferably distributed regularly while having between them intervals equal to two times the angular period, or to $2\cdot\beta$.

Figure 4:
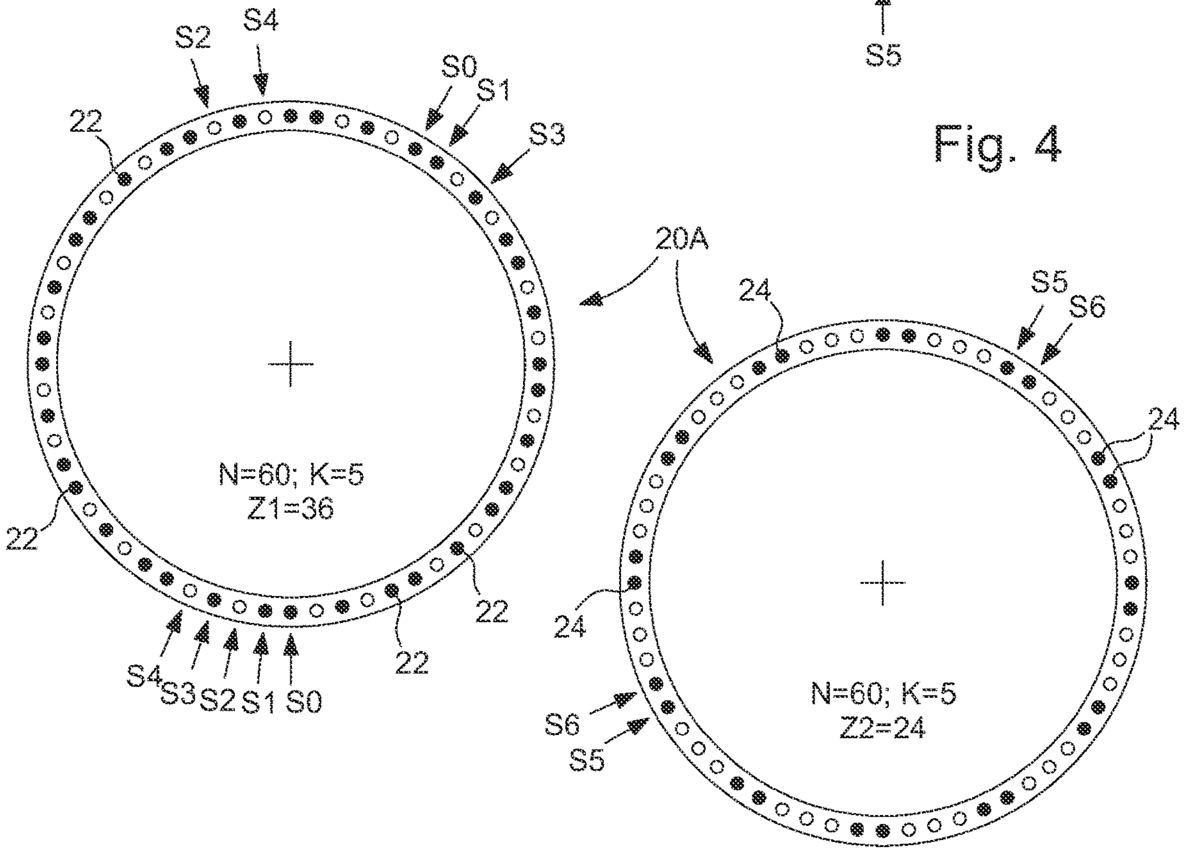
FIG. 4 shows, in a simplified manner, a second alternative of the magnetic device associated with the rotating bezel of the watch of FIG. 1.

In reference to FIG. 4, a second alternative of the first embodiment of the invention, which allows to increase the magnetic coupling between the bezel and the middle, without increasing the bulk of the magnetic device, will be described. In this second alternative, like in the first alternative shown in FIG. 2, the number N of angular positions is equal to sixty (N=60) and the number K for the angular period of variation of the resisting magnetic torque is equal to five (K=5). The magnetic device 20A is characterised in that one of the two numbers Z1 and Z2, defined above, is equal to twenty-four (Z1=24) and the twenty-four corresponding polar parts 24 are disposed in a first series S5 and a second series S6 each of twelve angular positions having between them the angular period β=30°, these first and second series being offset by the angular pitch α, whereas the other of the two numbers Z1 and Z2 is equal to thirty-six (Z2=36), like in the example shown for the first alternative, and three subsets each of twelve corresponding polar parts 22 are respectively placed into three series each of twelve angular positions having between them the angular period β, namely a third series S0, a fourth series S1 and a fifth series S3. The third and fourth series are offset, one relative to the other, by the angular pitch α while the fifth series is offset by two angular pitches, or by 2·α, with respect to each of these third and fourth series. The two other remaining series, each with twelve angular positions having between them the angular period, are empty, that is to say without polar parts.

Thus, twenty-four magnets facing twenty-four other magnets or, in one alternative, facing twenty-four ferromagnetic parts for the stable angular positions with a strong resisting magnetic torque, which have between them the angular period β, but twelve magnets facing twelve other magnets or, in the alternative, twelve ferromagnetic parts for the stable angular positions with a lesser resisting magnetic torque, which are located between the stable angular positions with a strong resisting magnetic torque, are obtained. There is therefore a ratio of ½, for the number of pairs of facing polar parts, between the stable angular positions with a lesser resisting magnetic torque and the stable angular positions with a strong resisting magnetic torque, which leads approximately to the same ratio for the intensity of the resisting magnetic torque as in the example shown for the first alternative. It is noted that, in another alternative, this ratio can be reduced by adding subsets of polar parts into the two aforementioned series of empty angular positions, the number of polar parts per subset added being identical and less than M, or less than twelve.

In a third alternative, not shown in the drawings but equivalent to the second alternative, also with the number N equal to sixty (N=60) and the number K equal to five (K=5), one of the two numbers Z1 and Z2 is equal to twenty-four and the twenty-four corresponding polar parts are disposed in a first series and a second series each of twelve angular positions having between them the angular period β, these first and second series being offset by two angular pitches, or by 2·α, whereas the other of the two numbers Z1 and Z2 is equal to thirty-six and three subsets each of twelve corresponding polar parts are respectively placed into a third series, a fourth series and a fifth series each of twelve angular positions having between them the angular period β. In this case, the fourth series is offset by the angular pitch α with the third series and also with the fifth series. The two other remaining series, each with twelve angular positions having between them the angular period, are empty, that is to say without polar parts. Like for the second alternative, it is possible, in another alternative, to modify the variation in the resisting magnetic torque by placing subsets of polar parts into the two aforementioned empty series, the number of polar parts per subset added being identical and less than M, or less than twelve, and for example equal to six or four polar parts distributed regularly.

The second alternative and the third alternative are very advantageous because, with only 25% of additional polar parts relative to the first alternative, the intensity of the resisting magnetic torque can be doubled without magnetic means other than two sets of polar parts each distributed along a circle and respectively associated with the rotating bezel and with the middle. In other words, for a certain given resisting magnetic torque for a watch with a rotating bezel, with substantially two intensity values provided for this given resisting torque according to the stable angular position, it is possible to reduce the dimensions of the polar parts relative to the first alterative, and thus the bulk of the magnetic device. It should be noted that alternatives similar to the second and third alternatives exist for other odd values of the number K.

Alternatives with substantially two intensity values for the resisting magnetic torque exist with more than two series of M polar parts on each of the two parts (the bezel and the middle) with the same distribution among the N angular positions, and with complementary series of polar parts on just one of these two parts. For example, for N equal to sixty (N=60) and K equal to ten (K=10), there can be, for each of the two parts, three subsets of six polar parts (M=N/K=6) that are placed respectively into three adjacent series, each having six angular positions having between them an angular period, and four other subsets of six polar parts that are placed respectively into four series, each having six angular positions having between them the angular period, among the seven series of six angular positions remaining on just one of these two parts, these four other series forming two pairs of adjacent series, each pair of adjacent series being surrounded by two empty series, that is to say without polar parts. Eighteen polar parts of one of the two parts facing eighteen polar parts of the other part are thus obtained for six stable angular positions separated by an angular period of 60°, and twelve polar parts of one of the two parts that are located facing twelve polar parts of the other part in the other stable angular positions. A ratio of approximately ⅔ between the two values of the resisting magnetic torque is thus obtained.

Figure 5:
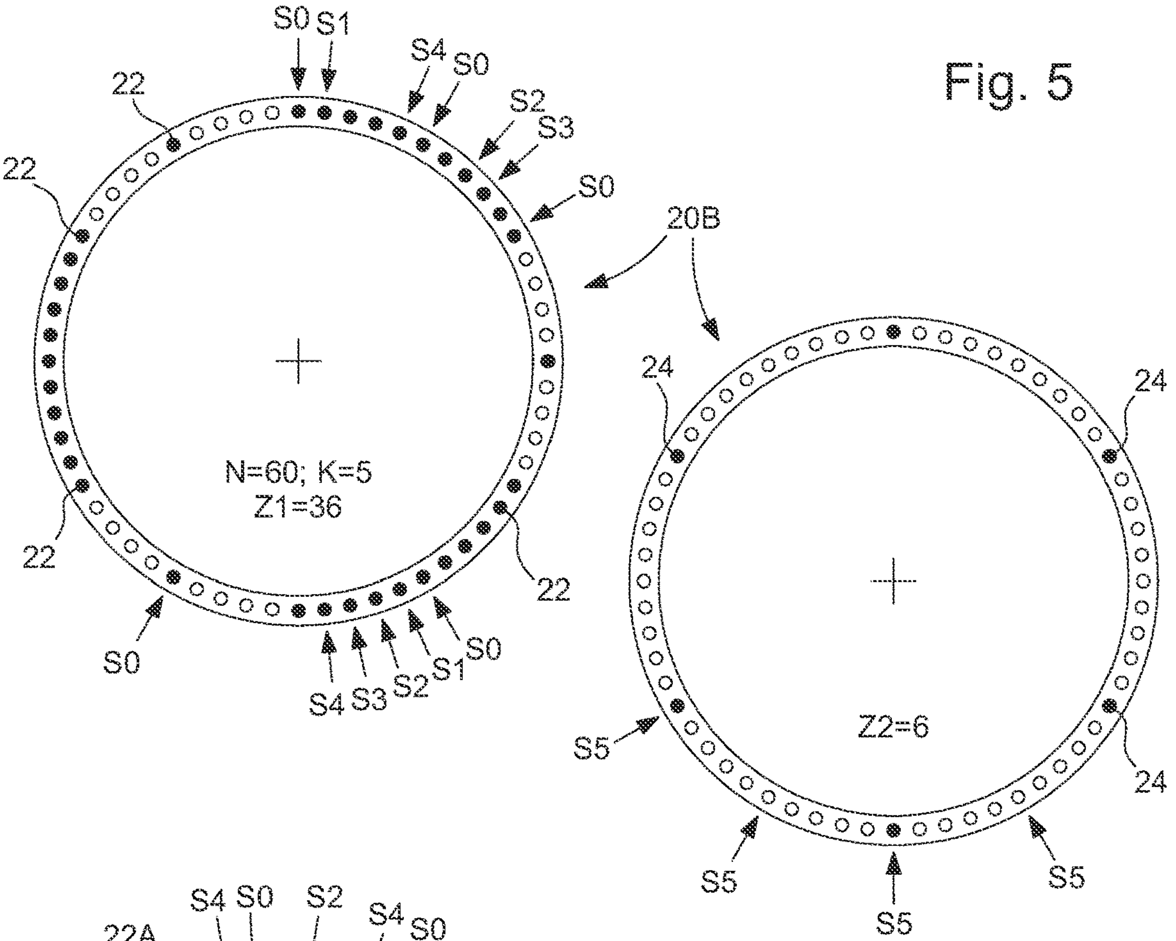
FIG. 5 shows, in a simplified manner, a third alternative of the magnetic device associated with the rotating bezel of the watch of FIG. 1.

A fourth alternative, less advantageous in terms of efficiency of the magnetic device, is shown in FIG. 5. This fourth alternative relates, like in the first alternative, to a case in which the integer K of angular pitches that the periodic variation of the resisting magnetic torque has is equal to five (K=5). This fourth alternative differs from the first alternative by the fact that the magnetic device 20B has a number Z2 of polar parts 24 that is divided by two, this number Z2 thus being equal to M/2, or to six (Z2=M/2=6). These six polar parts are distributed regularly with an angular distance/an interval that is equal to double the angular period, or equal to 2·β. The number Z1 of polar parts 22 is identical to the corresponding number of the example shown for the first alternative (Z1=36) and the distribution of these Z1 polar parts 22 corresponds the general case of this first alternative described above, but with an additional condition relative to this general case that is the following: The series of angular positions S1 to S4 (those comprising less than M polar parts in the first alternative) each comprise M/2 polar parts in this fourth alternative (like in the example shown of the first alternative), these six polar parts being distributed by pair of polar parts having between them, in the series in questions, an angular offset equal to an odd number, less than M/2, multiplied by the angular period. There are therefore three pairs of magnets 22 each having between their two magnets the aforementioned angular offset. It is thus understood that configurations other than that of FIG. 5 are possible. It is noted that in another alternative, it is possible for the number of pairs of polar parts in each of the series S1 to S4 to be less than three, namely equal to two or one. In this last case, there is an increase in the ratio of the resisting magnetic torques between the periodic angular positions of the rotating bezel having a certain resisting magnetic torque and those that have a lesser resisting magnetic torque, which is thus less than the case in which the number of pairs of polar parts is equal to three and in which said ratio is equal to two.

In reference to FIGS. 6 to 10, a second embodiment of the timepiece according to the invention will be described. This second embodiment is characterised in that the first set of first polar parts and the second set of second polar parts are each formed by permanent magnets engendering a magnetic repulsion between this first set and this second set, and in that the N stable angular positions of the rotating bezel 6A are each defined by a positioning of the N first angular positions, into which the magnets 22A rigidly connected to this rotating bezel are placed, with an angular offset equal to substantially half of said angular pitch ($\alpha/2$) relative to the N second angular positions of the middle 8A into which the magnets 24A rigidly connected to this middle are placed.

In the alternative shown in FIG. 6, the watch 32 comprises a case 34 that is formed by a middle 8A and a rotating bezel 6A. The references already described in relation to FIG. 1 relate to similar elements. The construction of the case differs from that of FIG. 1 substantially by the fact that the rotating bezel is mounted on a ball bearing 36 and by the fact that the magnetic device 20C comprises a first set of magnets 22A and a second set of magnets 24A that are each arranged circularly in the same general plane of the case 34, this general plane being perpendicular to the axis of rotation of the rotating bezel. As already mentioned above, such an arrangement allows to eliminate the axial magnetic forces. Moreover, a periodic arrangement of the magnets in each of the first and second sets of magnets, with an identical period or a second period equal to the first period times a positive integer, allows to make zero or very weak the global radial magnetic force for any angular position of the rotating bezel, so that the ball bearing is not or only very slightly disturbed in its operation by the forces of friction. The magnetic devices of the alternatives shown in FIGS. 7 to 10 have the periodic arrangement of the aforementioned magnets, so that in these alternatives, only the tangential magnetic forces between the two sets of magnets are active and engender the desired resisting magnetic torque, which corresponds to a magnetic return torque.

Given that the first set of magnets is arranged in magnetic repulsion relative to the second set of magnets, the magnetic potential energy is higher when magnets of these two sets are facing each other. In the absence of a mechanical positioning of the rotating bezel, the stable angular positions of the rotating bezel correspond to positions of lesser magnetic potential energy in the magnetic device 20C. These stable angular positions thus correspond to angular positions in which the first and second sets of magnet are substantially offset by half an angular pitch relative to one another. It should be noted that in the absence of mechanical positioning, some of the stable angular positions risk not being very precise, that is to say not being perfectly periodic, in particular each stable angular position of the rotating bezel that precedes a stable angular position having a relatively strong resisting magnetic torque and the one which follows the latter stable angular position. Thus, in a specific alternative, there can be in addition to the magnetic device 20C, a mechanical device for angular positioning of the rotating bezel, for example a wheel/toothed crown fastened to the bezel and associated with a jumper rigidly connected to the middle.

Figure 8:
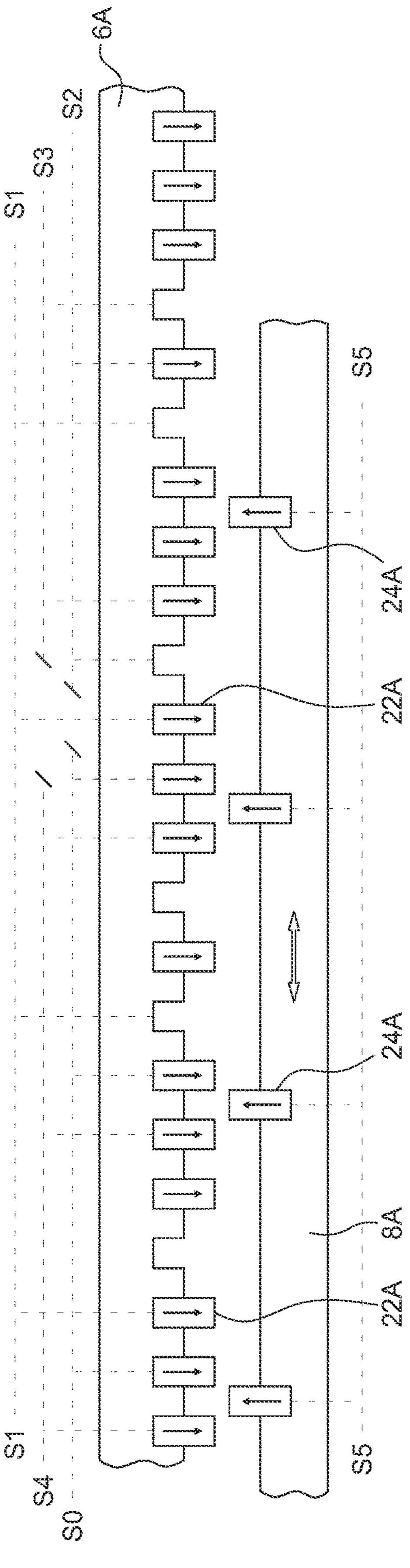
FIG. 8 is a linear diagram of the first alternative of the magnetic device of FIG. 7.

In reference to FIGS. 7 and 8, a first alternative of the second embodiment will be described. Like for the alternative of the first embodiment, the number N of stable angular positions of the rotating bezel 6A corresponds to the number of first angular positions linked to the rotating bezel and to the number of second angular positions linked to the middle for the arrangement of the magnetic device 20C, this number N being equal to sixty (N=60) and the number K, defined above, is equal to five (K=5). The middle 8A comprises a series of twelve magnets 24A (Z2=M=N/K=12) placed into a series S5 of twelve angular positions having between them the angular period $\beta=30°$. The rotating bezel 6A comprises two subsets of twelve magnets 22A placed into adjacent series S0 and S4 of twelve angular positions having between the angular period $\beta$. These two subsets of magnets 22A define twelve stable angular positions in which the rotating bezel undergoes a relatively strong resisting magnetic torque during a driving in one direction of rotation or the other, these twelve stable angular positions occurring when the twelve magnets 24A linked to the rotating bezel are respectively located between the twelve pairs of adjacent magnets 22A formed by the two subsets placed in the series S0 and S4. What is of great interest in this second embodiment stems from the fact that the magnetic device 20C engenders a high barrier of magnetic potential on both sides of the twelve stable angular positions of the rotating bezel that have a strong resisting magnetic torque, namely a strong magnetic return torque that is engendered by the tangential magnetic forces in the magnetic device 20C. Three other subsets of magnets 22A, each formed by six magnets, are distributed respectively into three other series S1, S2 and S3 of angular positions, each in a regular manner with an angular distance equal to double the angular period. Thus, the number Z1 of magnets carried by the rotating bezel is equal to forty-two (Z1=42). Given that these three other series S1 to S3 comprise two times less magnets that the series S0 and S4, the resisting magnetic torque (equal to the magnetic return torque in the embodiment of FIG. 6) is substantially divided by two when the rotating bezel is driven between two stable angular positions having a lesser resisting magnetic torque relative to driving from a stable angular position having lesser resisting magnetic torque towards a stable angular position with a strong resisting magnetic torque or vice versa.

In the context of the first embodiment with a magnetic device provided in magnetic attraction, the resisting magnetic torque felt, when the rotating bezel arrives in a stable angular position having a strong resisting magnetic torque, is not the same as that when such a stable angular position is exited. Indeed, in this first embodiment, when a stable angular position with a strong return torque is approached, the resisting magnetic torque passes through a maximum before decreasing and finally becoming a driving torque insofar as the friction forces are not too great. However, when the rotating bezel is driven in rotation from a stable angular position with a strong resisting magnetic torque, the user thus feels this strong resisting magnetic torque which opposes the movement of rotation of the rotating bezel. It is therefore necessary to arrive in such a stable angular position to be able to feel well that it is associated with a strong resisting magnetic torque. It should be noted that the same applies, to a lesser extent, for all the stable angular positions of the rotating bezel in the first embodiment.

The second embodiment provides an effective solution to the aforementioned problem that occurs in the first embodiment, via the fact that a relatively high barrier of magnetic potential is located before and after each of the twelve stable angular positions having a strong magnetic return torque. When a user actuates the rotating bezel, they feel the same thing when this rotating bezel carries out an angular pitch to arrive in a stable angular position having a strong magnetic return torque as when the rotating bezel carries out an angular pitch while leaving such a stable angular position. The same applies when a user actuates the rotating bezel between stable angular positions having a lesser resisting magnetic torque. However, it is noted that a lesser resisting magnetic torque only appears in one direction of rotation for the stable angular positions that are adjacent to a stable angular position with a strong resisting magnetic torque, in the direction that moves away from the latter stable angular position. Indeed, in the other direction, the rotating bezel rotates in the direction of the adjacent stable angular position which has a strong resisting magnetic torque and this rotating bezel is thus subjected to a high barrier of magnetic potential.

Figure 7:
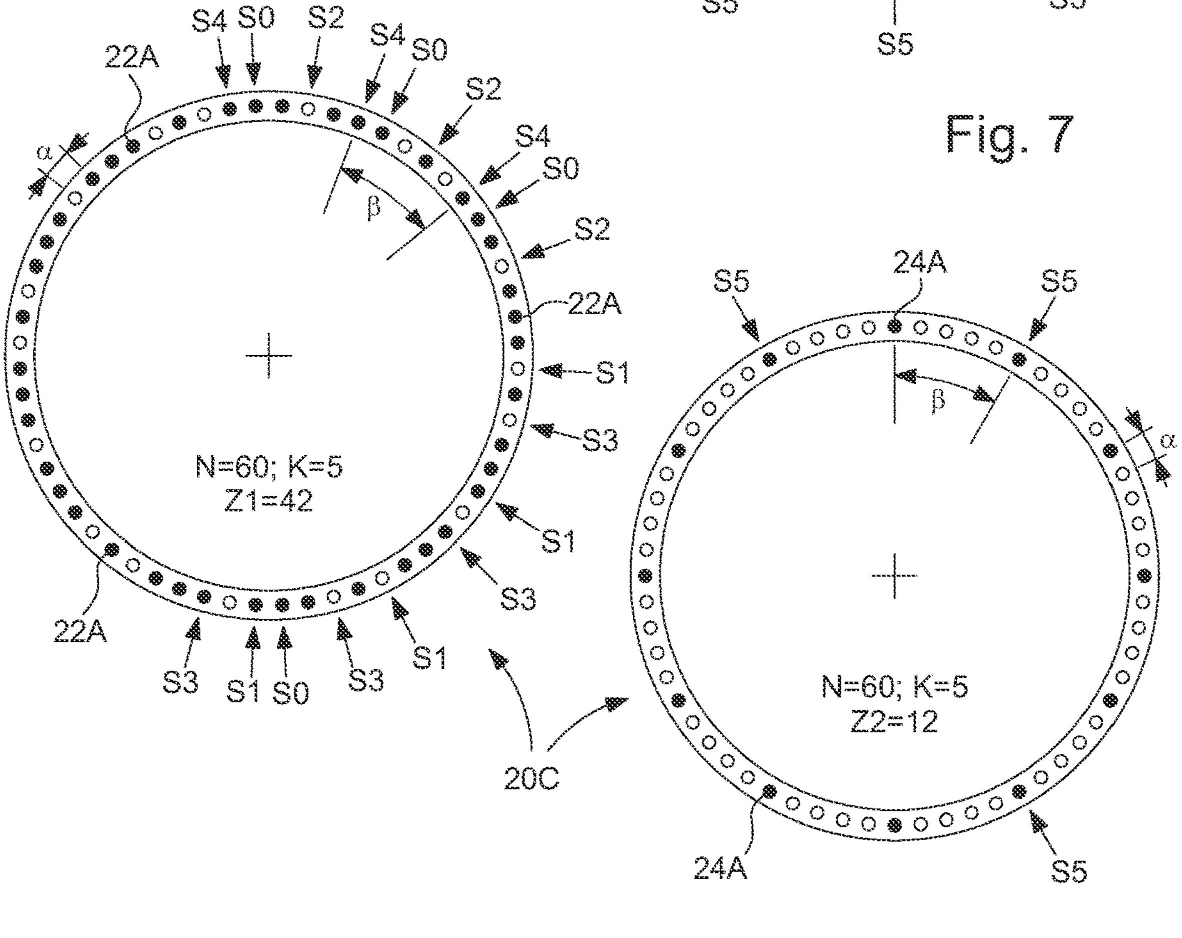
FIG. 7 shows, in a simplified manner, a first alternative of a magnetic device associated with the rotating bezel of the watch of FIG. 6 with, on the one hand, a first set of first polar parts that are rigidly connected to the rotating bezel or to a middle that supports it and, on the other hand, a second set of second polar parts that are rigidly connected to the other of these two parts of the external parts of the watch.
Figure 9:
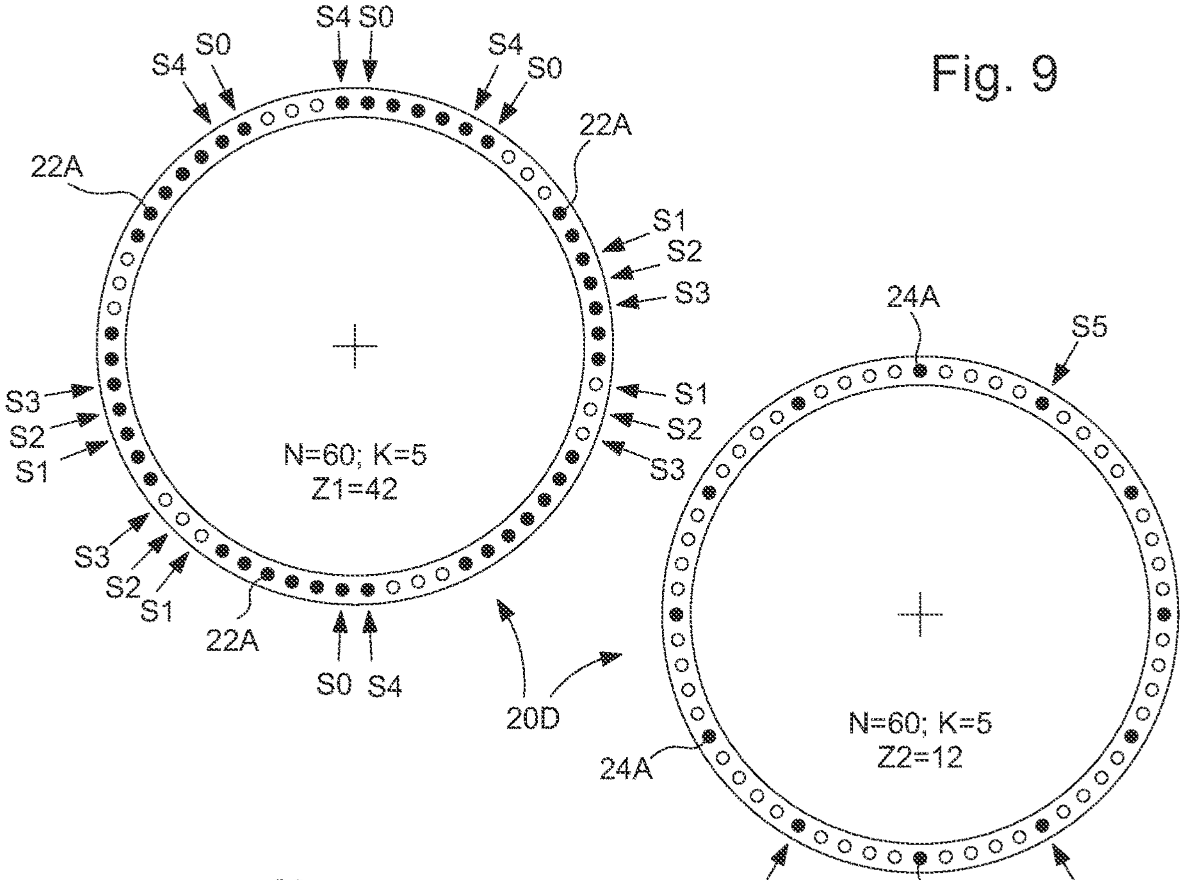
FIGS. 9 and 10 show, in a simplified manner, a second alternative and a third alternative of the magnetic device associated with the rotating bezel of the watch of FIG. 6, these alternatives being magnetically equivalent to the first alternative of FIGS. 7 and 8.
Figure 10:
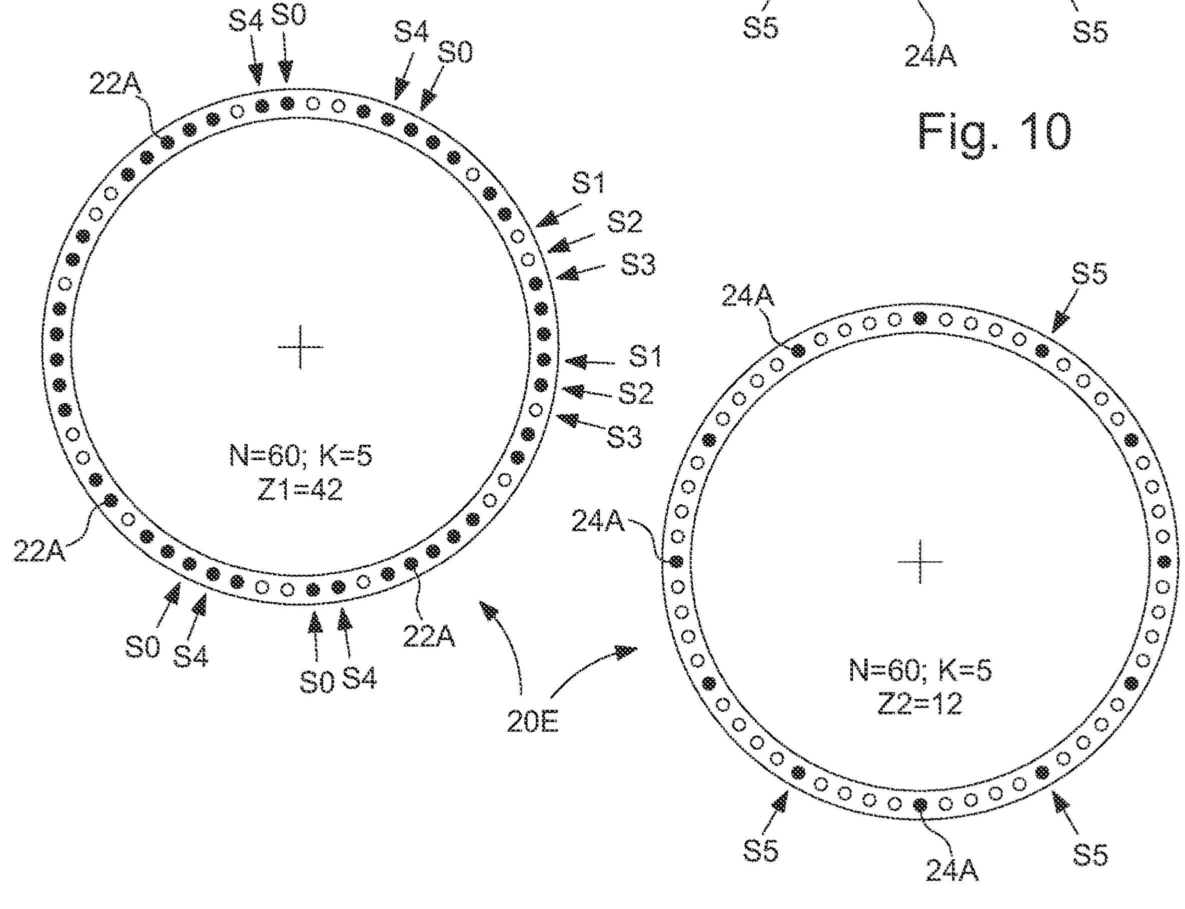

FIGS. 7, 9 and 10 give the three equivalent alternatives corresponding to three configurations of the magnetic device 20C, respectively 20D and 20E, with forty-two magnets 22A carried by the rotating bezel. These three alternatives are magnetically similar, that is to say that they engender the same resisting magnetic torque for each stable angular position of the rotating bezel. It should be noted that in other alternatives having a different level of the magnetic coupling for the stable angular positions having a lesser resisting magnetic torque, more or less magnets 22A can be provided in the series S1, S2 and S3 while maintaining the same number of magnets in each of these series that is less than M, or here than twelve. In other alternatives less effective for the resisting magnetic torque occurring in relation to the stable angular positions having a high resisting magnetic torque, the number of pairs of adjacent magnets in the series S0 and S4 can be reduced, while having less magnets in each of the intermediate series S1 to S3. It should be noted that in the latter case, it is not necessary to have pairs of adjacent magnets in the series S0 an S4, since it suffices to have the same number of magnets in each of these two series.

The three alternatives of the alternative described above can be generalised in the following terms: One of the two numbers Z1 and Z2 of magnets is equal to M (M=N/K) and the M corresponding magnets are distributed regularly while having between them intervals equal to the angular period (β), while the other of the two numbers Z1 and Z2 of magnets is equal to 2·M+[K−2]·Y, where Y is a positive integer smaller than M. Thus, first and second subsets each of M corresponding magnets are placed respectively into two series of M angular positions, these two series being offset between them by an angular pitch (α) and each having the angular period between their angular positions. Finally, the [K−2]·Y remaining corresponding magnets are distributed into the K−2 other series of M angular positions, having between them the angular period, in such a way that each comprises Y magnets, these K−2 other series and said two series being offset between them by the angular pitch (α). In a specific alternative corresponding to the three alternatives shown, the number M is an even number and the number Y is equal to M/2, the Y polar parts placed in each of the K−2 other series being distributed regularly while having between them angular distances equal to twice the angular period (2·β). One even more general alternative can be defined in the same way with said other of the two numbers Z1 and Z2 which is provided as equal to 2·W+[K−2]·Y, where W is a positive integer greater than one and less than or equal to M, and where Y is a positive integer smaller than W. Then, two adjacent series of angular positions each comprise W magnets and the remaining magnets are distributed in the manner indicated above.

The invention claimed is:

1. A timepiece, comprising:

a rotating bezel mounted on a part of external parts of the timepiece and which can be actuated in rotation by a user, the rotating bezel having N given stable angular positions, N being an integer greater than two, which have between them an angular pitch (α) equal to 360° divided by N (α=360°/N); and a magnetic device (6) including a first set of first polar parts carried in a fixed manner by the rotating bezel and of a second set of second polar parts carried in a fixed manner by the part of external parts, the first set of first polar parts and the second set of second polar parts each being arranged circularly in such a way that the first polar parts have a magnetic interaction with the second polar parts that engenders on the rotating bezel a resisting magnetic torque, over at least a part of the angular pitch, when the rotating bezel is driven in rotation, at least in one given direction, from any one of the N stable angular positions towards a following stable angular position, wherein a number Z1 of first polar parts in the first set is greater than one and less than N (1<Z1<N) and a number Z2 of second polar parts in the second set is also greater than one and less than N (1<Z2<N), wherein the first set of the Z1 first polar parts is distributed among N first angular positions, linked to the rotating bezel and having between them the angular pitch, with at most one first polar part per first angular position, and the second set of the Z2 second polar parts is distributed among N second angular positions, linked to the part of external parts and having between them the angular pitch, with at most one second polar part per second angular position, in such a way that the resisting magnetic torque has a variation according to the stable angular position of the rotating bezel, among the N stable angular positions, at least according to the given direction for the rotation of the rotating bezel, wherein the first polar parts have a same polarity as each other and the second polar parts have a same polarity as each other, and wherein the numbers Z1 and Z2 are selected and the distribution of the first set of the Z1 first polar parts, among the N first angular positions, as well as the distribution of the second set of the Z2 second polar parts, among the N second angular positions, are carried out so that the variation in the resisting magnetic torque is periodic, and wherein the periodic variation in the resisting magnetic torque has an angular period equal to an integer K of angular pitches, the integer K being greater than one and selected so that the division of the integer N by the integer K is equal to a positive integer M.

2. The timepiece according to claim 1, wherein the numbers Z1 and Z2 are selected and the distribution of the first set of Z1 first polar parts as well as the distribution of the second set of Z2 second polar parts are carried out so that the variation in the resisting magnetic torque has, at least for the given direction of rotation of the rotating bezel, substantially two non-zero distinct values.

3. The timepiece according to claim 2, wherein the number N is equal to sixty (N=60) and the integer K is equal to five (K=5).

4. The timepiece according to claim 1, wherein one of the two numbers Z1 and Z2 is equal to M and the M corresponding polar parts (24) are distributed regularly while having between them the angular period (β), while the other of the two numbers Z1 and Z2 is equal to M+[K−1]·Y, where Y is a positive integer smaller than M, and a subset of M corresponding polar parts (22) is placed into a first series (SO) of M angular positions having between them the angular period, the [K−1]·Y remaining corresponding polar parts being distributed into K−1 other series of M angular positions, having between them the angular period, in such a way that each comprises Y polar parts, these K−1 other series and the first series each being offset angularly by the angular pitch (α) relative to the two adjacent series.

5. The timepiece according to claim 4, wherein the number M is an even number and the number Y is equal to M/2, the Y polar parts placed in each of the K−1 other series being preferably distributed regularly while having between them intervals equal to two times the angular period (2·β).

6. The timepiece according to claim 1, wherein the number N is equal to sixty (N=60) and the integer K is equal to five (K=5), and wherein one of the two numbers Z1 and Z2 is equal to 2·M, or to twenty-four, and the twenty-four corresponding polar parts (24) are disposed in a first series (S5) and a second series (S6) each of twelve angular positions having between them the angular period (β), these first and second series being offset by the angular pitch (α), whereas the other of the two numbers Z1 and Z2 is equal to or greater than 3·M, or thirty-six, and three subsets each of twelve corresponding polar parts (22) are respectively placed into a third series (SO), a fourth series (S1) and a fifth series (S3) each of twelve angular positions having between them the angular period, the third and fourth series being offset by the angular pitch (α) while the fifth series is offset by two angular pitches (2·α) relative to each of these third and fourth series, a sixth series (S2) and a seventh series (S4), adjacent to the fifth series, each comprising the same number W of polar parts, the number W being smaller than the number M, or less than twelve.

7. The timepiece according to claim 6, wherein the number W is equal to zero.

8. The timepiece according to claim 1, wherein the number N is equal to sixty (N=60) and the integer K is equal to five (K=5), and wherein one of the two numbers Z1 and Z2 is equal to 2·M, or to twenty-four, and the twenty-four corresponding polar parts are disposed in a first series and a second series each of twelve angular positions having between them the angular period (β), these first and second series being offset by two angular pitches (2·α), whereas the other of the two numbers Z1 and Z2 is equal to or greater than 3·M, or thirty-six, and three subsets each of twelve corresponding polar parts are respectively placed into a third series, a fourth series and a fifth series each of twelve angular positions having between them the angular period, these third, fourth and fifth series being offset between them by the angular pitch (α), a sixth series and a seventh series adjacent and located between the fifth series and the third series each comprising the same number W of polar parts, the number W being smaller than the number M, or less than twelve.

9. The timepiece according to claim 1, wherein the first set of first polar parts and the second set of second polar parts are formed from materials engendering a magnetic attraction between the first set and the second set, and wherein the N stable angular positions of the rotating bezel are each defined by a positioning of first polar parts respectively facing second polar parts.

10. The timepiece according to claim 9, wherein the first set of first polar parts and the second set of second polar parts are both formed by permanent magnets.

11. The timepiece according to claim 9, wherein one set from among the first set of first polar parts and the second set of second polar parts is formed by permanent magnets, while the other set from among the first set of first polar parts and the second set of second polar parts is formed by parts made of ferromagnetic material.

12. The timepiece according to claim 1, wherein the first set of first polar parts and the second of second polar parts are formed by permanent magnets engendering a magnetic repulsion between the first set and the second set, and in that the N stable angular positions are each defined by a positioning of the N first angular positions with an angular offset equal to substantially half of the angular pitch (α/2) relative to the N second angular positions.

13. The timepiece according to claim 12, wherein one of the two numbers Z1 and Z2 is equal to M and the M corresponding magnets are distributed regularly while having between them angular distances equal to the angular period (β), whereas the other of the two numbers Z1 and Z2 is equal to 2·M+[K−2]·Y, where Y is a positive integer smaller than M, and first and second subsets each of M corresponding magnets are placed respectively into two series of M angular positions, these two series being offset between them by the angular pitch (α) and each having the angular period between their angular positions, the [K−2]·Y remaining corresponding magnets being distributed into K−2 other series of M angular positions, having between them the angular period, in such a way that each comprises Y magnets, these K−2 other series and the two series each being offset between them by the angular pitch (α).

14. The timepiece according to claim 13, wherein the number M is an even number and the number Y is equal to M/2, the Y magnets placed in each of the K−2 other series being distributed regularly while having between them angular distances equal to two times the angular period (2·β).

15. The timepiece according to claim 12, wherein the number N is equal to sixty (N=60) and the integer K is equal to five (K=5).

* * * * *